(12) United States Patent
Quinlan et al.

(10) Patent No.: US 9,666,864 B1
(45) Date of Patent: May 30, 2017

(54) VERTICALLY ORIENTED GRAPHENE-SUPPORTED ANODE

(71) Applicants: Ronald A. Quinlan, Williamsburg, VA (US); Ronald A. Outlaw, Williamsburg, VA (US); Azzam N. Mansour, Fairfax Station, VA (US)

(72) Inventors: Ronald A. Quinlan, Williamsburg, VA (US); Ronald A. Outlaw, Williamsburg, VA (US); Azzam N. Mansour, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/733,549

(22) Filed: Jun. 8, 2015

Related U.S. Application Data

(60) Provisional application No. 62/019,230, filed on Jun. 30, 2014.

(51) Int. Cl.
| | |
|---|---|
| *H01M 4/36* | (2006.01) |
| *H01M 4/133* | (2010.01) |
| *H01M 4/134* | (2010.01) |
| *H01M 4/587* | (2010.01) |
| *H01M 4/1395* | (2010.01) |
| *H01M 4/1393* | (2010.01) |
| *H01M 4/04* | (2006.01) |
| *H01M 4/38* | (2006.01) |
| *H01M 4/02* | (2006.01) |

(52) U.S. Cl.
CPC ......... *H01M 4/366* (2013.01); *H01M 4/0402* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 2004/027* (2013.01); *H01M 2220/20* (2013.01)

(58) Field of Classification Search
CPC .... H01M 4/366; H01M 4/0402; H01M 4/133; H01M 4/134; H01M 4/1393; H01M 4/1395; H01M 4/368; H01M 4/587; H01M 2004/027; H01M 2220/20
See application file for complete search history.

(56) References Cited

U.S. PATENT DOCUMENTS

| 8,488,300 B2 | 7/2013 | Meng et al. |
| 8,540,902 B2 | 9/2013 | Xing et al. |
| 8,722,256 B2 | 5/2014 | Narula et al. |

(Continued)

OTHER PUBLICATIONS

Miller et al. "Graphene electric double layer capacitor with ultra-high power performance"; Electrochimica Acta 56 (2011); available online Jun. 13, 2011; pp. 10443-10449.*

(Continued)

*Primary Examiner* — Gregg Cantelmo
(74) *Attorney, Agent, or Firm* — Dave A. Ghatt

(57) ABSTRACT

An electrode morphology and architecture for energy storage applications that increases the rate of charge/discharge, battery life, and decreases cost. The morphology and architecture directed towards a method and apparatus incorporating a graphene supported anode including a substrate, a vertically oriented graphene support arrangement coated with silicon or the like, in an electrolyte.

2 Claims, 4 Drawing Sheets

(56) References Cited

U.S. PATENT DOCUMENTS

2009/0214944 A1* 8/2009 Rojeski ............... H01M 4/131
  429/142
2012/0328943 A1  12/2012 Mah et al.

OTHER PUBLICATIONS

Minzhen et al. "A high density of vertically-oriented graphenes for use in electric double layer capacitors"; Carbon 50 (2012); available online Aug. 3, 2012; pp. 5481-5488.*

* cited by examiner

US 9,666,864 B1

VERTICALLY ORIENTED GRAPHENE-SUPPORTED ANODE

CROSS-REFERENCE TO RELATED APPLICATIONS

This application claims the benefit of U.S. Provisional Application No. 62/019,230, filed Jun. 30, 2014, which is incorporated herein by reference.

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to an electrode morphology and architecture for energy storage applications that increases the rate of charge/discharge, battery life, energy density, and decreases cost, in particular, a method and apparatus including a graphene supported anode including a substrate, a vertically oriented graphene support arrangement coated with silicon or the like in an electrolyte.

BACKGROUND

With growing demand for more efficient energy supplies, energy storage systems such as batteries and capacitors with higher energy and power densities are needed for powering vehicles and the like. Lithium ion batteries (LIBs) for example, are one of the most widely used portable power sources, and they have been instrumental in the development of more fuel-efficient vehicles, such as electric vehicles (EV) and hybrid electrical vehicles (HEV). However, loss of power and capacity upon storage or prolonged use especially at elevated temperature limits the application of LIBs for EV and HEY applications. Thus, there is a need to have Lithium-ion batteries with a higher energy density, higher power density, longer cycle life, longer calendar life, lower cost.

It is recognized that these devices may be improved by replacing graphite with silicon. Silicon has the potential to replace graphite as the active anode material in secondary lithium-ion electrochemical cells. The theoretical capacity of silicon is superior to that of graphite (4,200 mAh/$g_{(si)}$ vs. 373 mAh/$g_{(c)}$) assuming discharged products in the forms of $Li_{4.4}Si$ and $LiC_6$. However, current attempts to replace graphite with silicon or silicon-based materials have failed to meet cycle life requirements due to the volume expansion associated with lithiation of silicon material (Si→$Li_{4.4}Si$) and first cycle irreversible capacity loss.

These issues are not limited to Si-based anodes but are also associated with Sn-based anodes. To a much lesser extent, the volume expansion issue is also limiting the performance of cathodes in batteries with various types of cell chemistries. Some approaches to resolve the problems of Si-based anodes are the use of binding materials, such as PVDF, and making the powder material small, core-shell architectures that cover the silicon particles with carbon and evaporated thin films of silicon on nickel materials. It is desired to have an electrode morphology and architecture for energy storage devices as mentioned above, that increases the rate of charge/discharge, battery life, and decreases cost, and in particular, silicon architecture that avoids or minimizes volume expansion and related issues.

SUMMARY

In one aspect, the invention is a graphene supported anode. The graphene supported anode includes a substrate having a planar substrate surface. The graphene supported anode also includes a vertically oriented graphene support arrangement. The vertically oriented graphene support arrangement includes a plurality of basal nanosheets that are parallel to the planar substrate surface and a plurality of vertical nanosheets, extending upwards from the basal nanosheets, forming a plurality of peaks, with the peaks spaced apart by a distance D. In this aspect, the graphene supported anode also includes a silicon coating on the vertically oriented graphene support arrangement, the coating covering the plurality of peaks, wherein the silicon layer has a pre-expansion phase thickness t and an expansion phase thickness T.

In another aspect, the invention is a method of making a graphene supported anode. The method includes the providing of a copper substrate having a planar substrate surface. The method also includes growing a vertically oriented graphene support arrangement on the substrate. In this aspect, the vertically oriented graphene support arrangement includes a plurality of basal nanosheets that are parallel to the planar substrate surface, and a plurality of vertical nanosheets, extending upwards from the basal nanosheets, forming a plurality of peaks, the peaks spaced apart by a distance D. In this aspect, the method of making a graphene supported anode also includes the coating of the vertically oriented graphene support arrangement with silicon wherein the coating covers the plurality of peaks, and wherein the silicon layer has a pre-expansion phase thickness t.

BRIEF DESCRIPTION OF THE DRAWINGS

Other features will be apparent from the description, the drawings, and the claims.

DETAILED DESCRIPTION

Figure 1:
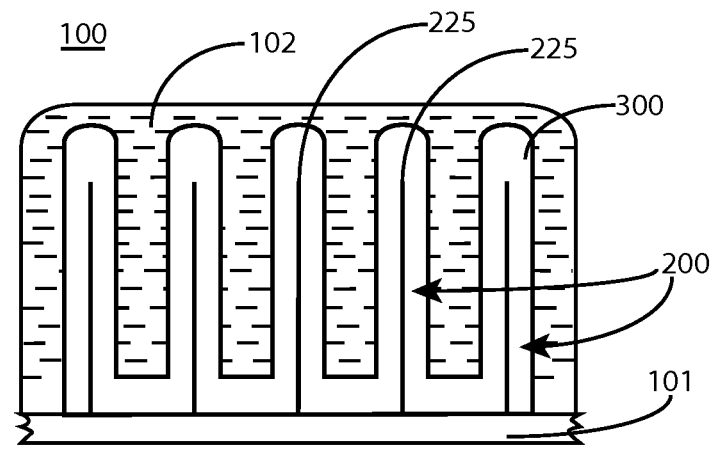
FIG. 1 is an exemplary schematic illustration of a vertically oriented graphene supported anode for electrochemical energy storage applications, according to an embodiment of the invention.

FIG. 1 is an exemplary illustration of a graphene supported anode 100 for electrochemical energy storage applications, according to an embodiment of the invention. As shown the anode includes a substrate 101 and an electrolyte 102. The substrate 101 has a planar surface and may be copper, nickel or the like. The electrolyte 102 may be any known liquid lithium based electrolyte, or the like.

FIG. 1 also shows a vertically oriented graphene support arrangement 200 on the substrate 101. As outlined below the vertically oriented graphene support arrangement 200 may be formed from nanosheets, and are grown on the substrate 101. The graphene supported anode also includes a coating 300 on the plurality of vertically oriented graphene supports.

According to a preferred embodiment of the invention, the coating 300 is silicon. In this environment, silicon typically has an undesired expansion phase. Consequently the graphene supported anode 100 is structured to accommodate this expansion and the accompanying drawbacks. As outlined below, the silicon coating 300 is provided be thin enough to limit expansion, yet thick enough to incorporate lithium to increase the energy density of the battery, which is desired. And even though there may still be some expansion, as outlined below, the vertically oriented graphene support arrangement 200 are spaced apart so that in the event of expansion of the silicon, adjacent silicon coatings do not abut, thereby maintaining the physical stature of the anode 100, and sustaining the chemical efficiency of the device. It should be noted that according to other embodiments of the invention, the coating 300 may be a silicon-based material, or a metal oxide material, such as FeO or NiO. Materials such as tin (Sn), germanium (Ge), or titanate ($TiO_3^{2-}$), may also be used as the coating 300.

Figure 2:
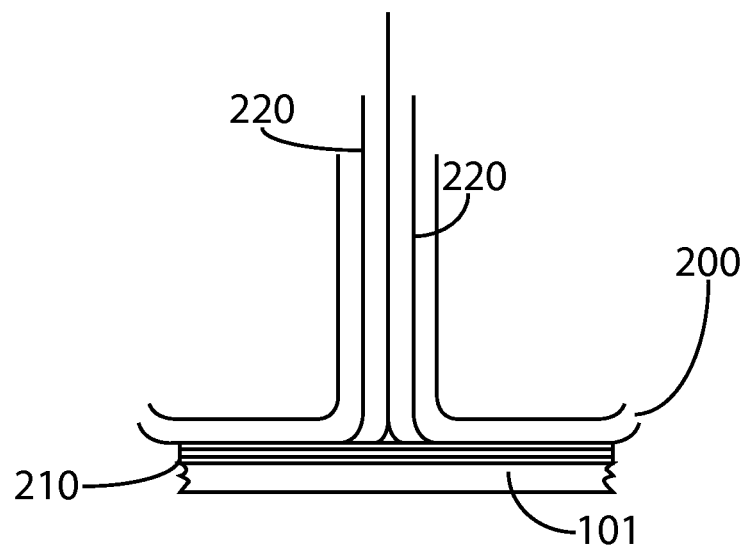
FIG. 2 is an exemplary schematic illustration of one of the vertically oriented graphene supports, according to an embodiment of the invention.

FIG. 2 is an exemplary schematic illustration of a portion of the vertically oriented graphene support arrangement 200, according to an embodiment of the invention. As shown, the vertically oriented graphene support arrangement 200 is made up of a plurality of nanosheets. FIG. 2 shows the graphene supports 200 having a plurality of basal nanosheets 210 that are parallel to the planar substrate surface. The graphene supports 200 also include a plurality of vertical nanosheets 220, extending upwards from the basal nanosheets 210. The plurality of vertical nanosheets 220 form individual peaks 225 (shown in FIG. 1) spaced apart from each other. As shown, the plurality of vertical nanosheets 220 form the vertical structure. Returning to FIG. 1, as shown, the coating 300 is grown over the entire vertically oriented graphene support arrangement 200.

The individual nanosheets 220 that form each peak 225 may be about 1-10 atomic layers thick, which depends on growth plasma parameters as well as the feedstock gas species. The spacing between the individual vertical nanosheets 220 may be about 0.37 nm. This spacing value may change depending on the number of nanosheets 220 that form each peak 225. As the number of nanosheets increase, the thickness will decrease to about 0.34 nm. The graphene surface is electrically conductive but chemically inert. The inert nature may contribute to poor sticking of the Si to the graphene surface. However, growth procedures may be modified so that defect sites on the outer planes of the vertical graphene sheets 220 can be intentionally introduced to create Si growth sites to enhance sticking. Post-synthesis surface modification procedures may be performed, such as the oxidation of the surface and doping, e.g.

The structure of the vertically oriented graphene supports 200 as outlined above provides a nanostructured support for silicon anode materials. Unlike carbon nanotubes which is known, the vertical graphene sheets do not require catalysts, have an interconnected electronic network and provide greater access to external surface area. This vertically oriented graphene support arrangement 200 attributes is very advantageous for silicon anode architectures.

As outlined above, the coating 300 is preferably made of silicon. According to this embodiment, the morphology of the vertically oriented graphene support arrangement 200 allows for increased exposure of the silicon coating 300 to the electrolyte 102 and, thus, fast diffusion of ions responsible for producing the electrical current. Furthermore, the morphology with the spaced apart vertically oriented peaks 225, allows for the expansion of the silicon coating 300 in an outward fashion, keeping contact with the graphene (and thereby electrical conduction) and preventing degradation of the material during cell cycling. Additionally, because contact is maintained with the graphene material, electrical conduction is retained throughout the process without the need for a binder material or additional electrical conducting material (such as carbon black), which lowers the cost and increases the stored energy per unit mass and per unit volatile of the overall device. Moreover, the approach can be used to enhance the performance of anodes as well as cathodes used in batteries and capacitors and could be applicable to a wide range of cell chemistries.

Figure 3A:
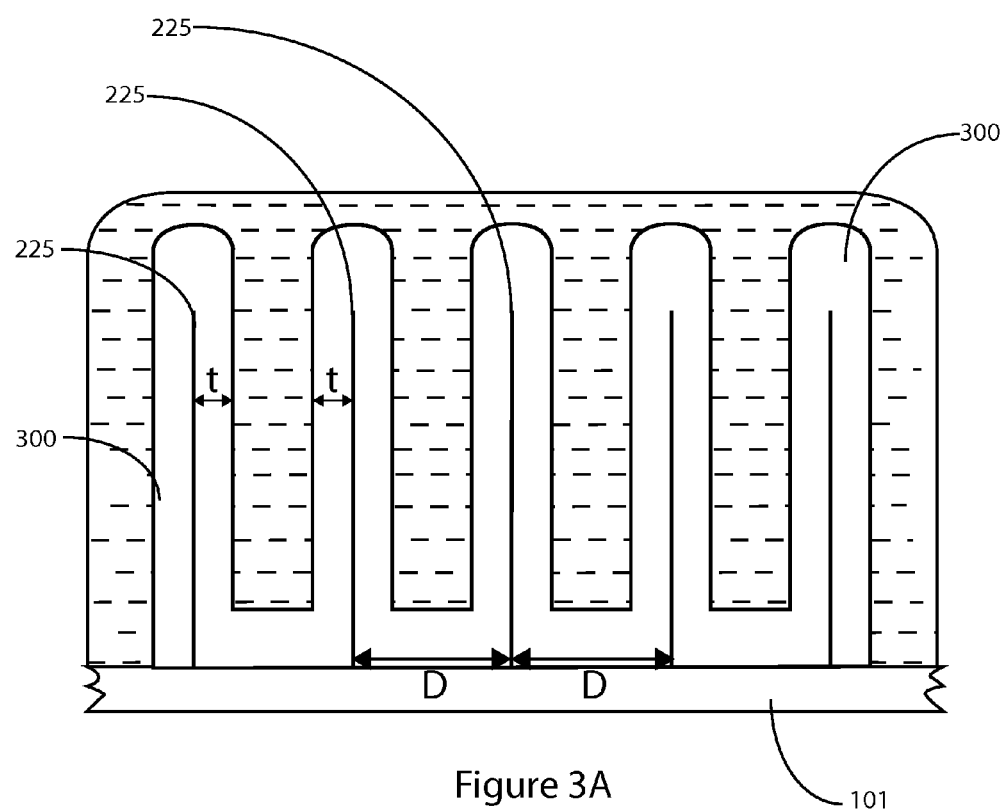
FIG. 3A is an exemplary schematic illustration of a vertically graphene supported anode for electrochemical energy storage applications, according to an embodiment of the invention.
Figure 3B:
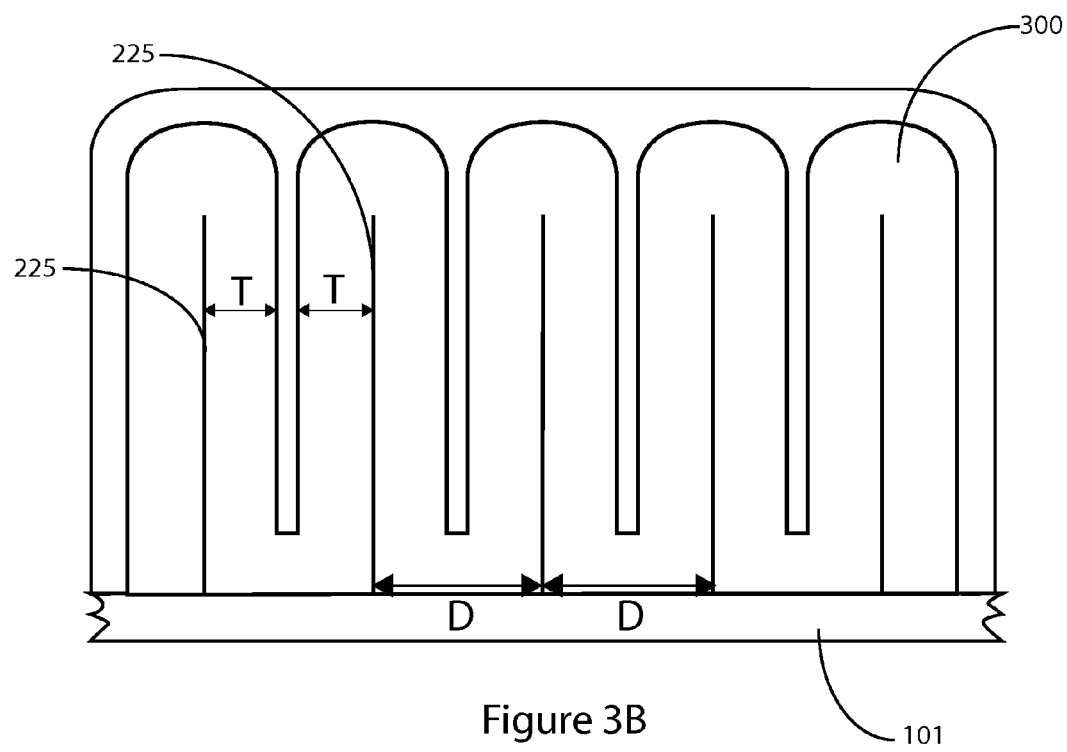
FIG. 3B is an exemplary schematic illustration of a vertically graphene supported anode for electrochemical energy storage applications, after the expansion of the silicon coating, according to an embodiment of the invention.

FIG. 3A is an exemplary schematic illustration of a vertically graphene supported anode 100 for electrochemical energy storage applications, prior to the expansion of the silicon coating 300, according to an embodiment of the invention. FIG. 3A shows the anode 100 with the substrate 101 and the electrolyte 102. FIG. 3A also shows the vertically oriented graphene support arrangement 200 and the coating 300, which according to this embodiment is silicon. FIG. 3A shows the silicon coating 300 having a thickness t. The thickness t is a pre-expansion phase thickness, and is selected so that the silicon has limited expansion, yet is thick enough to incorporate lithium to increase the energy density of the battery. Accordingly, t is preferably about 20 nm to about 100 nm. According to an embodiment of the invention the thickness t may be greater than 100 nm. FIG. 3A also shows the spacing between adjacent peaks 225 of the vertically oriented graphene support arrangement 200 being D. According to an embodiment of the invention, D may be about 50 nm to 400 nm, depending on growth parameters, including but not limited to substrate temperature, and gas composition. FIG. 3B is an exemplary schematic illustration of a vertically graphene supported anode 100 for electrochemical energy storage applications, after the expansion of the silicon coating 300, according to an embodiment of the invention. FIG. 3B shows the anode 100 with the substrate 101 and the electrolyte 102. FIG. 3A also shows the graphene support arrangement 200 and the silicon coating 300 in an expanded state, the coating 300 having an expanded thickness T. The silicone coating 300 expands from thickness t to thickness T when the Si crystal lattice expands to incorporate lithium.

FIG. 3B also shows the spacing between adjacent peaks 225 of the vertically oriented graphene support arrangement 200 being D. As shown, the peaks 225 are spaced apart by the distance D, so that even though the silicon coating 300 is in an expanded state, having the expansion phase thickness T, adjacent silicon coatings do not abut, thereby maintaining the physical stature of the anode 100. Thus, the combined expansion phase thickness of the two adjacent silicon layers, (2T), is less than D, the distance between adjacent peaks 225. (2T<D).

Figure 4:
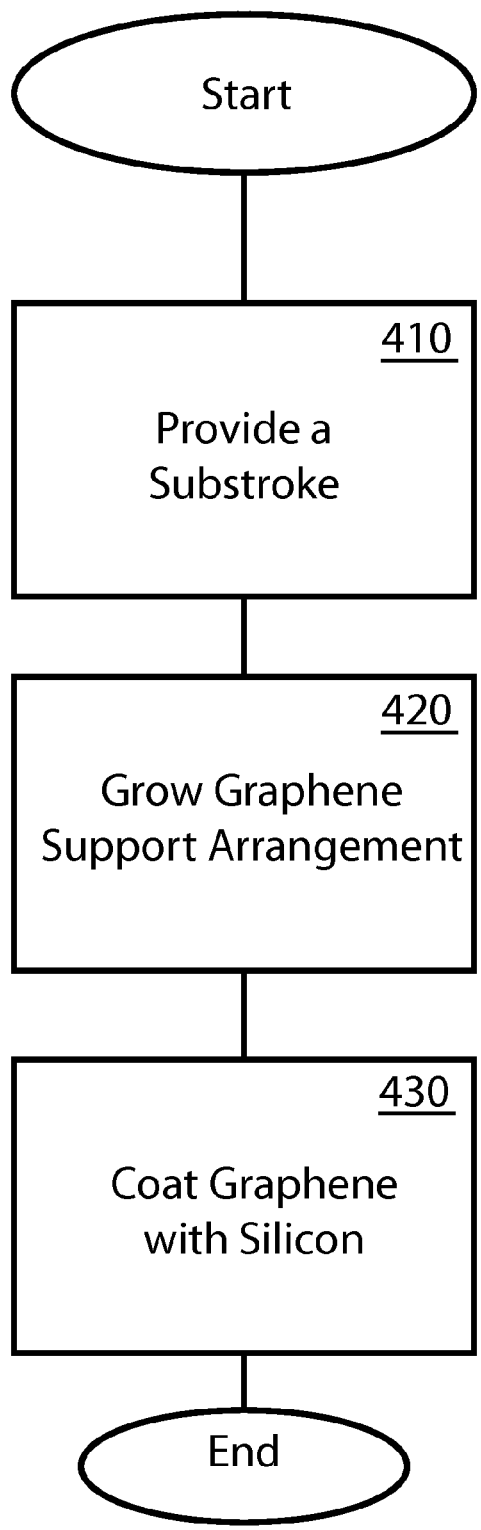
FIG. 4 is an exemplary flow chart showing a method of making a vertically oriented graphene anode, according to an embodiment of the invention.

FIG. 4 is an exemplary flow chart broadly outlining steps involved in a method 400 of making a vertically oriented graphene anode, according to an embodiment of the invention. It should be noted that FIG. 4 represents the broad steps associated with the making of a vertically oriented graphene anode. As outlined above, each step illustrated in FIG. 4 may include a plurality of sub-steps. These sub-steps are not represented in the flow chart of FIG. 4, but are outlined in the written description. Step 410 is the providing of a substrate 101 is preferably copper, but alternatively other known substrates such as nickel may be used.

Step 420 is the growing of the vertically oriented graphene support arrangement 200 on the substrate 101, which as outlined above is preferably made of copper. The graphene materials may be grown via radio frequency plasma-enhanced chemical vapor deposition. As outlined above, the vertically oriented graphene support arrangement 200 is made up of a plurality of basal nanosheets 210 that are parallel to substrate surface, and a plurality of vertical nanosheets 220, extending upwards from the basal nanosheets 210. Control over the morphological properties of the graphene support arrangement 200, such as the spacing between the vertical nanosheets 220 is achieved by the controlled variation of parameters such as feedstock composition, substrate bias and deposition temperature also provides control over morphological properties, including the spacing between vertical sheets according to this method, the individual nanosheets 220 that form each peak 225 may be about 1-10 atomic layers thick, and the spacing between the individual vertical nanosheets 220 may be about 0.37 nm. As outlined above, this spacing value may change depending on the number of nanosheets 220 that form each peak 225. As the number of nanosheets increase, the thickness will decrease to about 0.34 nm.

The morphology of the vertically oriented graphene support arrangement 200 including the spacing between adjacent peaks 225 offers room for the expansion of Si during alloying, thereby preventing delamination of the Si. However, growth procedures may be modified so that defect sites on the outer planes of the vertical graphene sheets 220 can be intentionally introduced to create Si growth sites to enhance sticking. Furthermore, these defect sites will act to enhance the Si film-graphene interface, which can prevent beading, should beading occur and be found to be detrimental. Additionally, the CVD growth process allows the intentional growth of Si droplets with defined spacing should it be required to prevent pulverization.

Step 430 is the coating of the graphene with silicon. The silicon coating 300 may be deposited by electron beam evaporation in an ultrahigh vacuum environment to limit formation of $SiO_x$ species. The process allows for the conformal coating of the graphene material, producing uniform coatings. The deposition technique also allows for control over the Si active layer's thickness t. As stated above, the inert nature may contribute to poor sticking of the Si to the graphene surface. Thus, alternatively, growth procedures may be modified so that defect sites on the outer planes of the vertical graphene sheets 220 can be intentionally introduced to create Si growth sites to enhance sticking.

The coating thickness t (shown in FIG. 3) is the pre-expansion phase thickness, and is selected so that the silicon has limited expansion, yet is thick enough to incorporate lithium to increase the energy density of the battery. Accordingly, the silicon coating 300 may have a pre-expansion thickness t of about 20 nm to about 100 nm. It should be noted that when the coating transforms from pre-expansion thickness t to expansion thickness T, the anode structure 100 benefits from the combination of the morphology of the vertically oriented graphene support arrangement 200 including the spacing of the peaks 225, and the pre-expansion coating thickness t. Because of these features, when the coating transforms from pre-expansion thickness t to expansion thickness T, adjacent silicon coatings do not abut, thereby maintaining the physical stature of the anode 100. Thus, the combined thickness of the two adjacent silicon layers, which is approximately 2T, is less than D, the distance between adjacent peaks 225 of the vertically oriented graphene support arrangement 200. (2T<D). Additionally, as outlined above, the arrangement 200 also provides support for the coating 300.

What has been described and illustrated herein are preferred embodiments of the invention along with some variations. The terms, descriptions and figures used herein are set forth by way of illustration only and are not meant as limitations. Those Skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A graphene supported anode comprising:
a substrate having a planar substrate surface;
a vertically oriented graphene support arrangement comprising:
   a plurality of basal nanosheets that are parallel to the planar substrate surface; and
   a plurality of vertical nanosheets, extending upwards from the basal nanosheets,
   forming a plurality of peaks, the peaks spaced apart by a distance D;
a silicon coating on the vertically oriented graphene support arrangement, the coating covering the plurality of peaks, wherein the silicon layer has a pre-expansion phase thickness t and an expansion phase thickness T, wherein the distance D is 50 nm to 400 nm, and the pre-expansion phase thickness t is 20 am to 100 nm, the distance D and the thickness t selected so that when the silicon coating transforms to the expansion phase thickness T, wherein 2T<D, the adjacent silicon layers do not abut.

2. A method of making a graphene supported anode comprising:
providing a copper substrate having a planar substrate surface;
growing a vertically oriented graphene support arrangement on the substrate, wherein the vertically oriented graphed support arrangement comprises:
   a plurality of basal nanosheets that are parallel to the planar substrate surface; and
   a plurality of vertical nanosheets, extending upwards from the basal nanosheets,
   forming a plurality of peaks the peaks spaced apart by a distance D; and
coating of the vertically oriented graphene support arrangement with silicon wherein the coating covers the plurality of peaks, and wherein the silicon layer has a pre-expansion phase thickness t and an expansion phase thickness T, wherein the distance D is 50 nm to 400 nm, and the pre-expansion phase thickness t is 20 nm to 100 nm, the distance D and the thickness t selected so that when the silicon coating transforms to the expansion phase thickness T, wherein 2T<D, the adjacent silicon layers do not abut.

* * * * *